(12) United States Patent
Beatty et al.

(10) Patent No.: US 6,310,749 B1
(45) Date of Patent: *Oct. 30, 2001

(54) VOICE COIL MOTOR ACTUATOR VIBRATION ISOLATOR

(75) Inventors: Paul A. Beatty, Longmont; Walter Wong, Boulder; James Staggers, Longmont, all of CO (US)

(73) Assignee: Seagate Technology LLC, Scotts Valley, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/136,622

(22) Filed: Aug. 19, 1998

Related U.S. Application Data
(60) Provisional application No. 60/056,046, filed on Sep. 2, 1997.

(51) Int. Cl.[7] ............................................. G11B 5/54
(52) U.S. Cl. ..................................... 360/265.7; 360/265.8
(58) Field of Search .................................. 360/104, 105, 360/106, 265.7, 265.8

(56) References Cited

U.S. PATENT DOCUMENTS

| 5,523,912 | * | 6/1996 | Koriyama | 360/106 |
| 5,734,528 | * | 3/1998 | Jabbari et al. | 360/106 |
| 5,790,348 | * | 8/1998 | Alfred et al. | 360/106 |
| 5,801,905 | * | 9/1998 | Schirle et al. | 360/104 |
| 5,805,388 | * | 9/1998 | Engwall | 360/106 |
| 5,808,840 | * | 9/1998 | Ishimatsu | 360/106 |
| 5,862,019 | * | 1/1999 | Larson | 360/106 |
| 5,949,617 | * | 9/1999 | Zhu | 360/104 |
| 6,034,843 | * | 3/2000 | Tsujino et al. | 360/106 |

* cited by examiner

Primary Examiner—Jefferson Evans
(74) Attorney, Agent, or Firm—Derek J. Berger; Jonathan E. Olson; Shawn B. Dempster

(57) ABSTRACT

A disk drive having a novel actuator assembly. The actuator assembly comprises a voice coil motor assembly, a pivotable actuator arm, and a head gimbal assembly including a read/write head. The voice coil motor assembly is attached at a back end of the actuator arm, and the head gimbal assembly is mounted on the actuator arm on a front end opposite of the back end. The voice coil motor assembly includes a voice coil interposed between two magnets and a top plate and a bottom plate. The voice coil motor assembly is secured to the base of the disk drive by posts. The actuator arm includes the back end, a pivot point and impeding apertures. The impeding apertures include two holes located near the back end of the actuator arm between the pivot point and the voice coil motor assembly and extend entirely through the actuator arm. The actuator arm may also include plugging members. The plugging members are inserted into the impeding apertures and extend entirely through the impeding apertures. The plugging members are of the same circumferential size and configuration as the impeding apertures. In operation, the voice coil motor assembly produces a force which pivots the actuator arm in order to position the read/write heads over individual tracks on the disk. The force produced by the voice coil motor assembly creates a vibration which emanates throughout the actuator arm and propagates toward the read/write heads. The vibration reaches the impeding apertures and is reflected back towards the voice coil motor. The vibration may also be dampened if plugging members are inserted in the impeding apertures.

16 Claims, 7 Drawing Sheets

VOICE COIL MOTOR ACTUATOR VIBRATION ISOLATOR

CLAIM OF PRIORITY

This application claims the benefit of U.S. Provisional Application No. 60/056,046 filed on Sep. 2, 1997.

BACKGROUND OF THE INVENTION

1. Field of the Invention

The present invention relates to disk drives, and in particular to an actuator arm which isolates vibration emanating from a voice coil motor on the actuator arm.

2. Description of Related Art

Conventional disk drives for use in workstations, personal computers and portable computers are required to provide a large amount of data storage within a minimum physical space. In general, Winchester type disk drives operate by transferring data between read/write transducing heads and one or more rotating magnetic storage disks. Positioning of the heads at the desired location of a respective data track on the disk is accomplished by an actuator assembly coupled to control electronics. The electronics control rotation of the disk, positioning of the actuator assembly, and the read/write functions of the head.

Greater demands are being placed on disk drives because they are key components to the high performance computer systems of today and the future. With the ongoing significant increase in real-time usage of high-resolution, digitized graphical and video images in desktop computers, the development of portable information appliances for both home and office environments, and emerging fiber-optic and satellite-linked Internet international communication infrastructure, it is of paramount importance to have available recording devices which offer higher performance and precision for the massive online computer data storage applications of the future. All such systems require a hard drive having high capacity storage capability. One way to increase storage capacity is to decrease the read/write head "flying height" (i.e. the height the head flies above the disk during drive operation). However, at present day flying heights, intermittent contact of the read/write head with the disk becomes a significant design factor. In conventional disk drive Systems, such intermittent contact may result in read/write errors and/or disk drive failure, and may result from mechanical resonances, spindle runouts, temperature drifts, humidity variations, external shocks and vibrations, bearing hysteresis, cable bias and various other sources.

Since disk drives will most likely remain the primary memory device in computer applications, disk drives will require greater storage capacities, while at the same time becoming more compact, faster, and less expensive. These changes will require greater emphasis on lower flying heights for heads, higher data transmission speeds, and more cost-effective disk drive assemblies. One factor which must be addressed in meeting these demands is the vibration resonance of the actuator assembly. The actuator assembly is responsible for accurately positioning the read/write head over the desired track for retrieving or storing information. Because the actuator assembly is an essential part of the high speed data transmission path, there is a need for an improved actuator arm which reduces or eliminates mechanical vibrations. These vibrations occur as a result of the voice coil forces exerted on the actuator arm by the voice coil motor. Often times in conventional disk drives, vibrations originating from sources within the disk drive are transmitted to neighboring structures, to the detriment of the internal environment.

The actuator assembly consists of a voice coil motor assembly, an actuator arm, a suspension assembly, and read/write heads. The actuator arm is attached to the suspension assembly which holds the read/write heads in position while pressing the heads toward the disk surface. The head flies above the disk at a height established by the equilibrium of the suspension force and the force of the air stream under the head as the disk rotates. The voice coil motor assembly comprises a voice coil mounted at a back end of the actuator arm, between two magnets attached to a top and bottom plate and secured by posts. Upon introduction of a current through the voice coil, the magnets exert a force on the voice coil to pivot the actuator assembly and move the read/write heads over a desired data track. In addition to the positioning function, the voice coil maintains the read/write head position relative to the desired track being read, constantly making fine-scale position corrections and adjustments to follow that particular track.

Time-varying forces exerted on the voice coil by the magnets create vibration. The material of a standard metal actuator arm has a very small vibration damping coefficient, and therefore, any vibration caused by the voice coil motor will resonate through the actuator arm. This mechanical vibration is transmitted during normal drive operation through the actuator arm to the head suspensions and ultimately to the read/write heads themselves.

Any vibration generated by the voice coil will affect the flying height, as well as the positioning of the read/write heads. In order to maintain proper head/media interface, the actuator assembly must be very flexible. Specifically, components of the suspension assembly are designed to be flexible (while other parts of the actuator assembly are designed to be rigid, such as the actuator arm) because compliance in the components allow the read/write head to be retained close to the disk under severe vibration or shock conditions. However, mechanical flexibilities in the actuator assembly tend to increase vibration in the actuator assembly because the actuator components have one or more resonant frequencies. Reduction of the vibration amplitude of the read/write heads under operating conditions will allow a higher track density and thus a higher disk information storage capacity.

Vibration in the actuator further impairs settling of the actuator assembly to a position aligned over a desired data track, thereby adversely affecting access times. Access time is the interval between the time a request is made by the control system and the time the data is available from the disk drive, and is a combination of seek time, head switch time and rotational latency. Specifically, it is a measure of how long it takes to position a read/write head over a particular track and find the desired sector or sectors within the track for reading or writing. Under moderate vibration, the read/write head will not settle quickly to its proper position above the desired data track. As a result, the access time will be extended because the read/write head must wait for another entire disk rotation before data can be transferred. Under severe vibration, the head may never settle over the desired track. In this case, the control system will sense a fault and shut the disk drive down. At present track densities, a lateral vibration of the read/write head on the magnitude of even ten millionths of an inch relative to a data track center line on a disk will cause the processes of reading information from the disk or writing information to the disk to be aborted. It is therefore crucial for actuator arm designers to seek the optimal combination of compliancy in the yaw, pitch and roll torques, while producing the greatest stability and immunity to vibrations in order that the access time is not severely affected or the disk drive shut down. Given the tolerances involved in manufacturing disk drives and the speed at which drives operate, the ability to locate data and move the heads accurately to read or write data is essential to increased data transmission speeds.

To counter the effects of vibration and ensure precise head alignment and positioning, conventional disk drives have incorporated an electromechanical technique called servo positioning which compensates for vibration created by the actuator assembly. The servo positioning device provides feedback to the drive electronics which control the position of the read/write heads (the servo-positioning device is integrated into the read/write head). When the read/write heads arrive at an intended track location, the read/write heads read positioning information embedded in a servo data location. The read/write heads send back the information to the servo-positioning device. The drive electronics then adjust the position of the actuator arm to accurately center the read/write head over the desired track so that a maximum signal may be read from the embedded information. However, this method can be difficult to implement in some disk drives, such as disk drives which use multiple zone recording techniques. Also, at certain frequencies where the actuator arm exhibits severe vibrations, the servo control positioning device may be severely taxed.

Another device used for countering the effects of vibration caused by the actuator assembly is a constrained layer damper which is applied on the flexure of the suspension assembly. The damper device is made of, for example, a Mylar material which has an adhesive attached to it. Together the Mylar and adhesive have intrinsic damping properties and reduces minor vibration. The damper device dissipates some of the vibration energy of the actuator assembly through applying friction However, this method can be expensive by adding fabrication costs to the disk drive, and can be difficult to install properly.

SUMMARY OF THE INVENTION

It is therefore an advantage of the present invention to provide an actuator assembly capable of reducing the transmission of vibration in the actuator arm from the voice coil to the read/write head.

It is another advantage of the present invention to provide an actuator arm having impeding apertures for isolating transmission of the vibration to the read/write heads.

It is still a further advantage of the present invention to provide an actuator arm wherein plugging members are inserted into the impeding apertures for damping transmission of the vibration to the read/write heads.

It is another advantage of the present invention to provide an actuator arm wherein the plugging members are a different material than the material of the actuator arm.

It is yet another advantage of the present invention to provide impeding apertures which reflect the vibration back towards the voice coil.

It is still another advantage to provide an actuator arm wherein the plugging members are inserted into the impeding apertures for precisely balancing the actuator arm.

It is a further advantage of the present invention to reduce the potential for damage to the read/write heads in comparison to conventional actuators.

It is yet another advantage of the present invention to provide an actuator assembly which is capable of accurately positioning the read/write heads over a desired track for retrieving or storing information.

These and other advantages are provided by the present invention, which in preferred embodiments relate to a new and improved actuator assembly. In the preferred embodiment, the actuator assembly comprises a voice coil motor assembly attached to a back end of a pivotable actuator arm, and a head gimbal assembly mounted on the actuator arm on a front end opposite to the back end. The voice coil motor assembly includes a voice coil interposed between two magnets and two magnet plates. The magnets and magnet plates are secured to the base of the disk drive by magnetic return posts. The actuator arm includes the back end, a pivot point and impeding apertures. The impeding apertures may be a plurality of holes, preferably two, located near the back end of the actuator arm between the pivot point and the voice coil motor assembly. The impeding apertures extend entirely through the actuator arm. An even number of impeding apertures on opposed longitudinal sides of the actuator arm is preferred in order to provide equal amounts of weight on either side of the pivot point so that the actuator arm is precisely balanced. The actuator arm may also include plugging members. The plugging members are inserted into and in proximate contact with the impeding apertures and extend entirely through the impeding apertures. The plugging members are of the same circumferential size and configuration as the impeding apertures. The plugging members are preferably formed of a plastic or metal material, such as cured urethane resin or Nitinol metal.

In the disk drive operation of retrieving or writing data, the voice coil motor assembly, which is located at the back end of the actuator arm, produces a force which pivots the actuator arm in order to position the read/write heads over individual tracks on the disk. The force produced by the voice coil motor assembly creates a vibration which propagates toward the read/write heads. The vibration reaches the impeding apertures and is reflected back towards the voice coil motor assembly, thus exhibiting a vibration isolation effect. The vibration may also be dampened if plugging members are inserted into the impeding apertures.

BRIEF DESCRIPTION OF THE DRAWINGS

The present invention will now be described with reference to the drawings, in which.

DETAILED DESCRIPTION OF THE PREFERRED EMBODIMENTS

The present invention will now be described with reference to FIGS. 1 through 6 which in general relate to a disk drive having an actuator assembly which includes a novel method for isolating vibration resonating from a voice coil motor assembly. The disk drive described herein includes a hard disk assembly incorporating various numbers of hard disks and utilizing Winchester technology. It is understood that the disk drive of the present invention may utilize other types of disks, for example, optical disks, and other read/write technologies, such as for example lasers. In a preferred embodiment, the present invention may be utilized in a so-called 3.5 inch form factor disk drive, which includes hard disk having a diameter of approximately 3.5 inches. However, it is understood that the present invention may be used with larger or smaller form factor disk drives.

Figure 1:
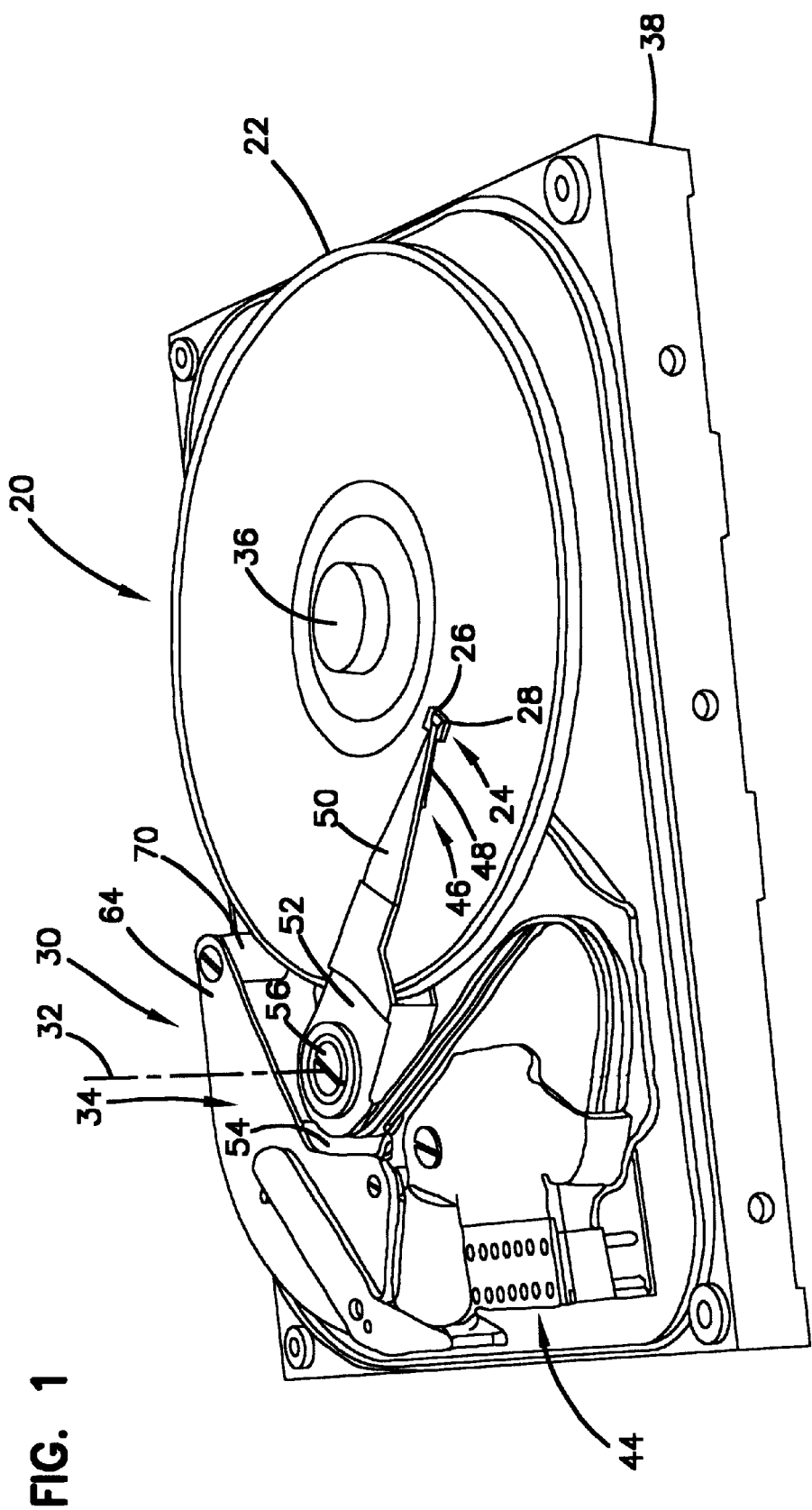
FIG. 1 is an isometric view of a disk drive according to the present invention.
Figure 2:
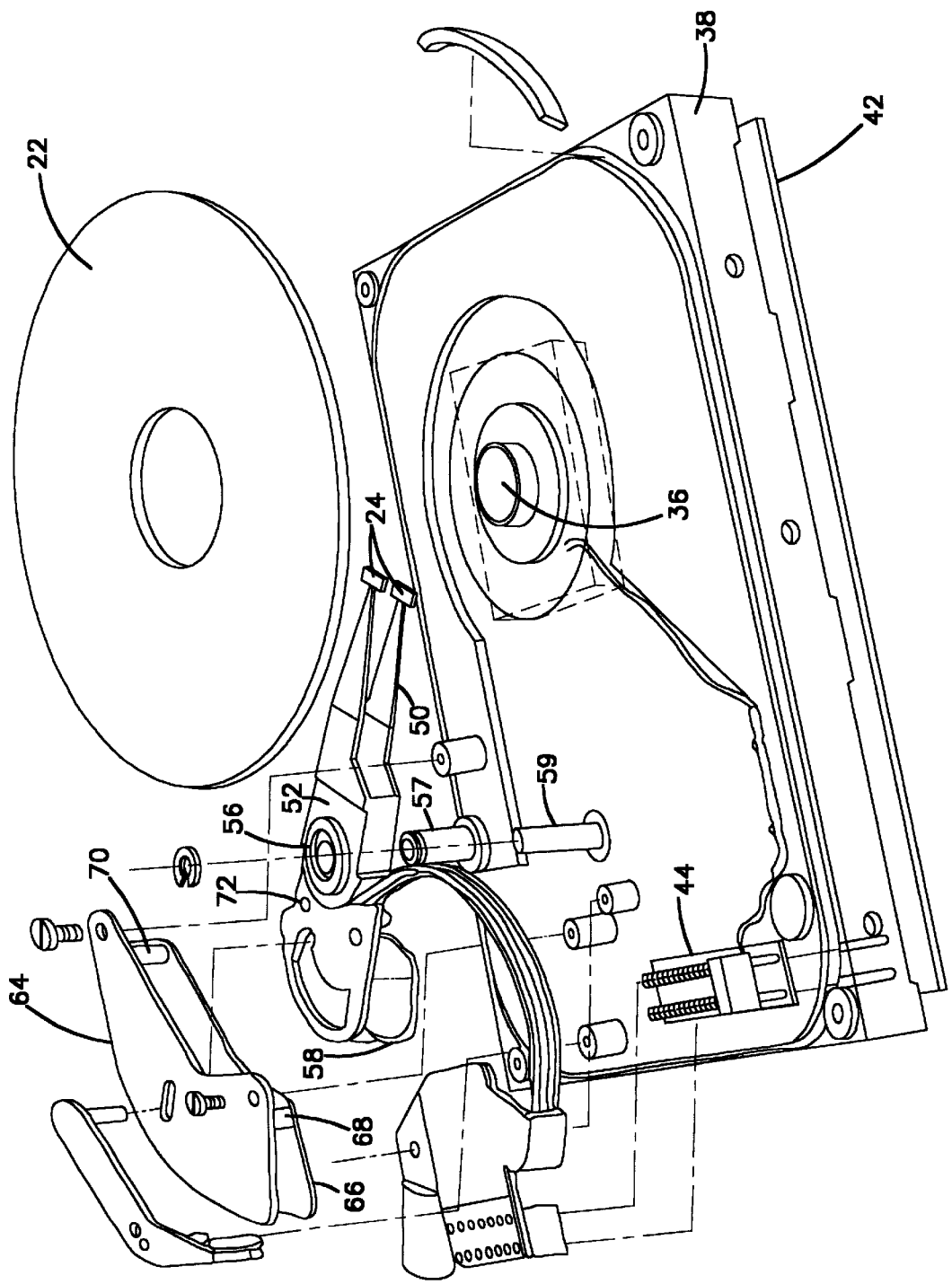
FIG. 2 is an exploded isometric view of the disk drive according to the present invention.
Figure 3:
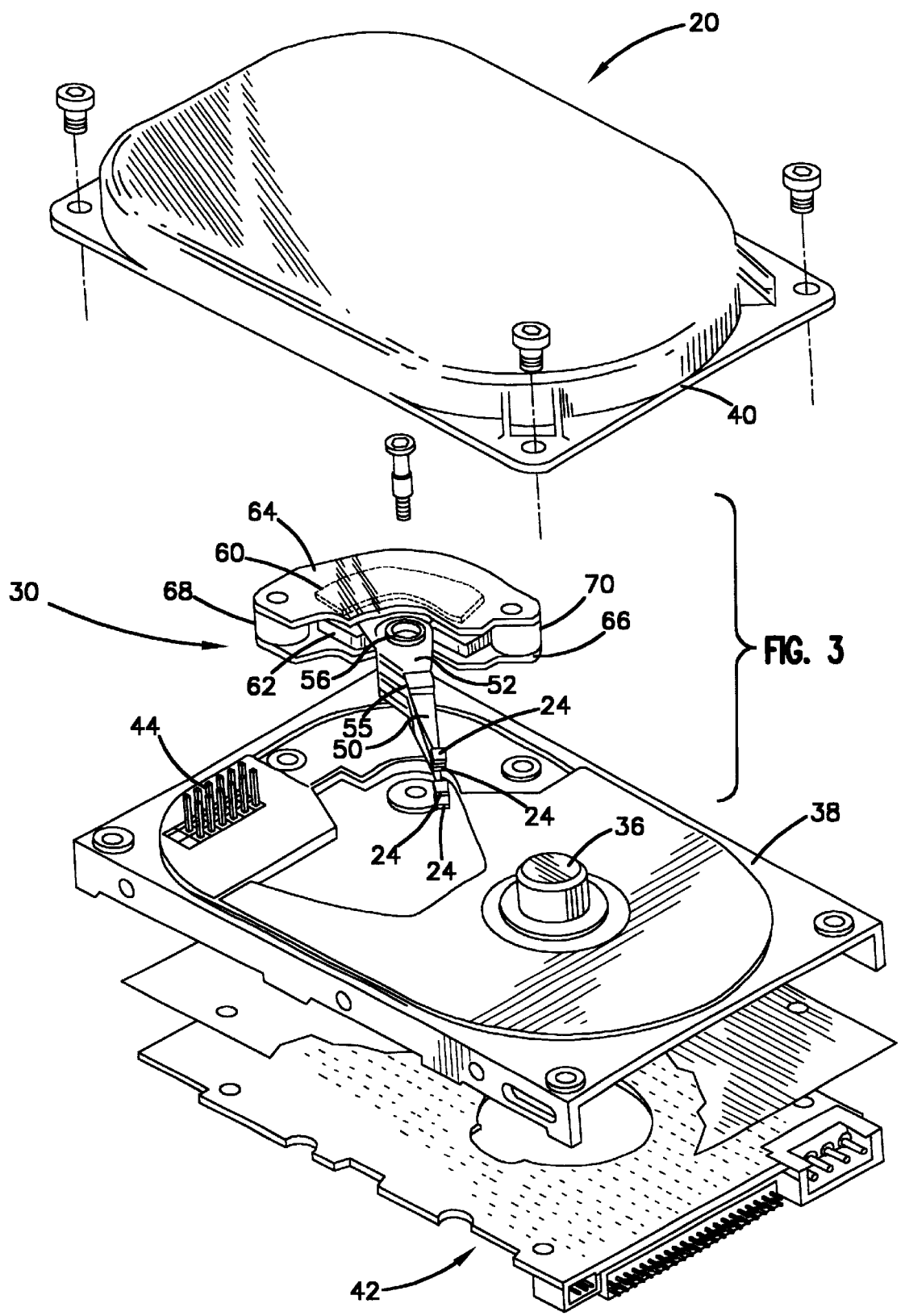
FIG. 3 is an exploded isometric view of the disk drive illustrating the cover and control electronics according to the present invention.

Referring now to FIGS. 1–3, there is shown a disk drive 20 including a hard disk 22 and a plurality of read/write heads 24, one head 24 per disk surface. Each is read/write head 24 includes a transducer 26 mounted to a slider 28 (See FIG. 1). The slider 28 is in turn supported on an actuator assembly 30. The heads 24 may utilize inductive transducers, such as for example those manufactured by Read-Rite, 345 Los Coches, Milpitas, Calif. It is understood that the type of read/write transducer used is not critical to the present invention, and other head technologies, such as magneto-resistive (MR) transducing elements, may be used in alternative embodiments of the invention. It is also understood that a plurality of disks may be utilized with the present invention.

The actuator assembly 30 is pivotally mounted to a base 38 so as to pivot around an axis 32 in response to a force exerted on the actuator assembly by a voice coil motor assembly 34. The actuator assembly, including the voice coil motor assembly, will be explained in greater detail below.

As is known in the art, during operation of the drive 20, disk 22 is rotated by spin motor 36 and actuator assembly 30 pivots the read/write heads 24 across the surfaces of the disk so that data is transferred between the read/write heads and the disk in a plurality of concentric data tracks. Slider 28 includes a pair of rails (not shown) along the length of the slider, which rails are provided to support the transducers on an air bearing a small distance above the surface of the disk 22 as the disk rotates. It is understood that the air bearing surface may comprise three pads or many other elaborate geometries. In a preferred embodiment, each of the heads may have a flying height of between one to four microinches, and optimally about 1.5 microinches. It is understood that the measure of flying height of the read/write head above the disk is not critical to the present invention and may vary significantly in alternate embodiments.

The above-described head and disc assembly ("HDA") may be mounted within the base 38 and a cover 40, which together form an enclosure of known construction to shield the HDA against particulates in the surrounding environment. Control electronics 42 may be affixed to the enclosure and electrically coupled to the HDA via a conventional header 44. The control electronics may be used to control rotation of the disk, positioning of the actuator assembly, and transfer of information between the transducers and the disk.

The actuator assembly 30 according to the present invention includes a head-gimbal assembly ("HGA") 46, as shown in FIG. 1. The HGA 46 consists of the read/write head 24, supported on a flexure 48. The flexure 48 is in turn mounted on a suspension arm 50. The suspension arm 50 is provided to exert a force or load to bias the read/write head 24 toward the surface of disk 22. During operation of the drive, the force of the suspension arm 50 opposes and counterbalances the force of the cushion of air under the slider so that the read/write head reaches an equilibrium state at the desired flying height. The suspension arm 50 may be formed of a rigid lightweight material such as, for example, a light gauge (thin) sheet metal, usually a stainless steel alloy, and may be formed by stamping, casting or machining. It is understood that other materials may be used for the suspension arm, such as various polymers, aluminum alloy and other metals, and that the suspension arm may be formed by processes other than stamping, casting or machining.

It is an important function of flexure 48 to provide a gimbaling action which allows the read/write head 24 to fly flat over the disk, i.e., to orient the surface of the read/write head 24 so that it is generally parallel to the disk while the disk is rotating. Toward this end, flexure 48 typically includes a tongue (not shown) provided at an angle with respect to the main body of flexure. The angle of the tongue with respect to the flexure is provided to compensate for the angle that the suspension arm 50 forms with respect to the disk surface. When read/write head 24 is mounted to the flexure tongue, the read/write head 24 is generally parallel to the surface of the disk 22. The flexure 48 is preferably formed of a sheet of thin, flexible stainless steel. It is understood that the flexure may be formed from other materials, such as for example aluminum or aluminum alloy, and by other processes. The width of the flexure is preferably similar to or less than the width of the suspension arm.

Figure 4:
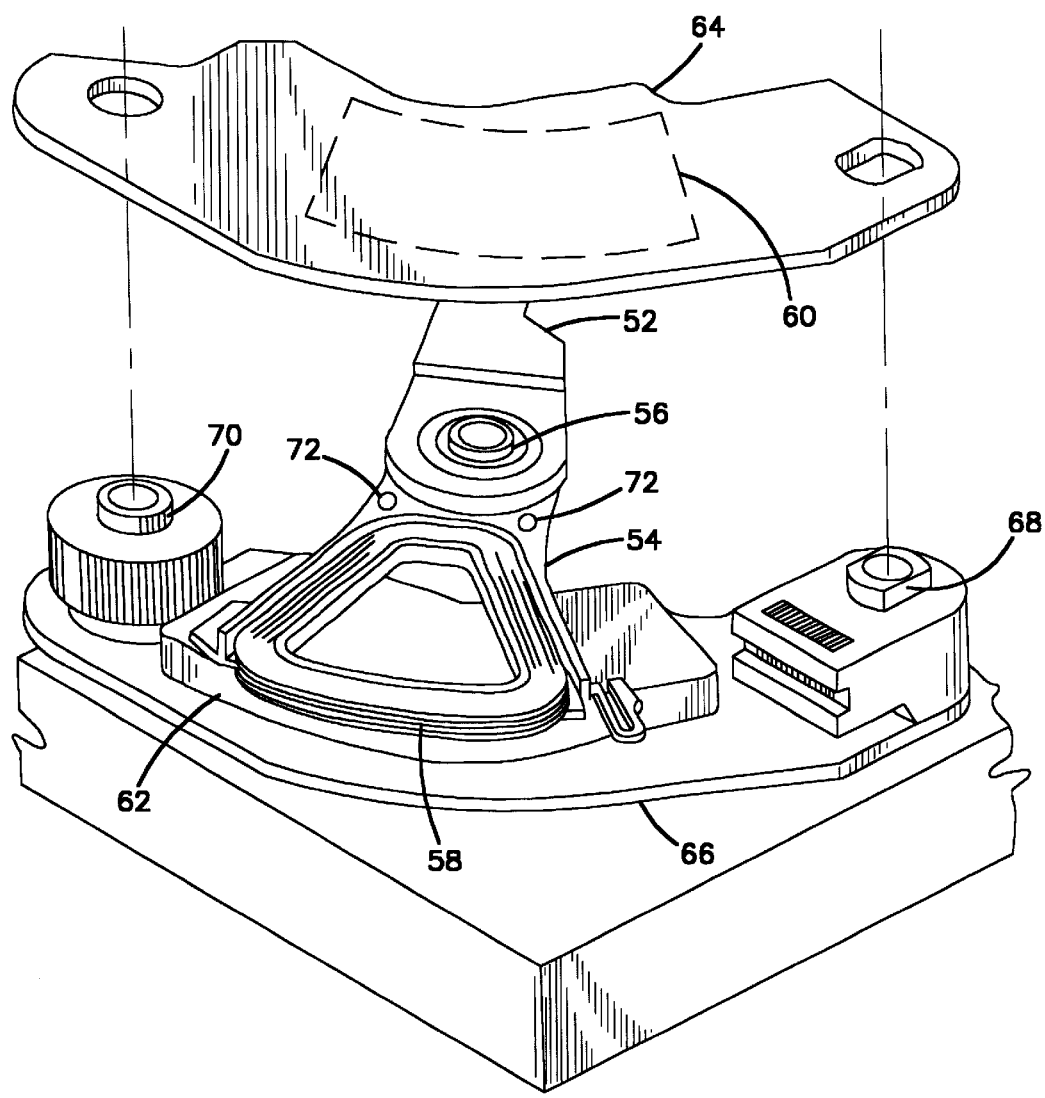
FIG. 4 is an exploded isometric view of the actuator assembly illustrating a voice coil motor assembly according to the present invention.

Referring now to FIGS. 3 and 4, the actuator assembly 30 includes a voice coil motor assembly 34, a pivotable actuator arm 52, and the HGA 46. The voice coil motor assembly 34 is mounted at a back end 54 of the actuator arm 52, and the HGA 46 is mounted on the actuator arm at a front end 55 opposite of the back end 54. The actuator arm 52 also includes a pivot point 56 located in between the opposite ends of the actuator arm 52. The actuator assembly 30 is mounted on a bearings 57 (FIG. 2) at pivot point 56, which is in turn seated on a pin 59 protruding from the base and thereby allowing the activator to pivot around the pivot point 56.

With reference now to the voice coil motor assembly 30, the assembly 30 includes a voice coil 58 interposed between two magnets 60, 62 which are attached to a top plate 64 and a bottom plate 66, respectively. The voice coil motor assembly 34 is secured to the base 38 of the disk drive by posts 68, 70. The plates and posts are formed of magnetically permeable material and provide returns for the magnetic fields generated by the magnets. The magnets and the voice coil are arranged so that a current in the voice coil passes through the magnetic fields created by the magnets and produces a force which pivots the actuator arm. Currents passing in opposite directions of the voice coil create torques in opposite directions and pivot the actuator arm in opposite directions, to position the read/write heads at desired locations on the disk. It is understood that the configuration of the voice coil motor assembly is not critical to the present invention, and may vary in alternative embodiments. For example, the voice coil motor assembly may comprise a single magnet having a post mounted below the voice coil. Moreover, although a rotary actuator is disclosed, the present invention may operate with a linear actuator in alternative embodiments.

Figure 5:
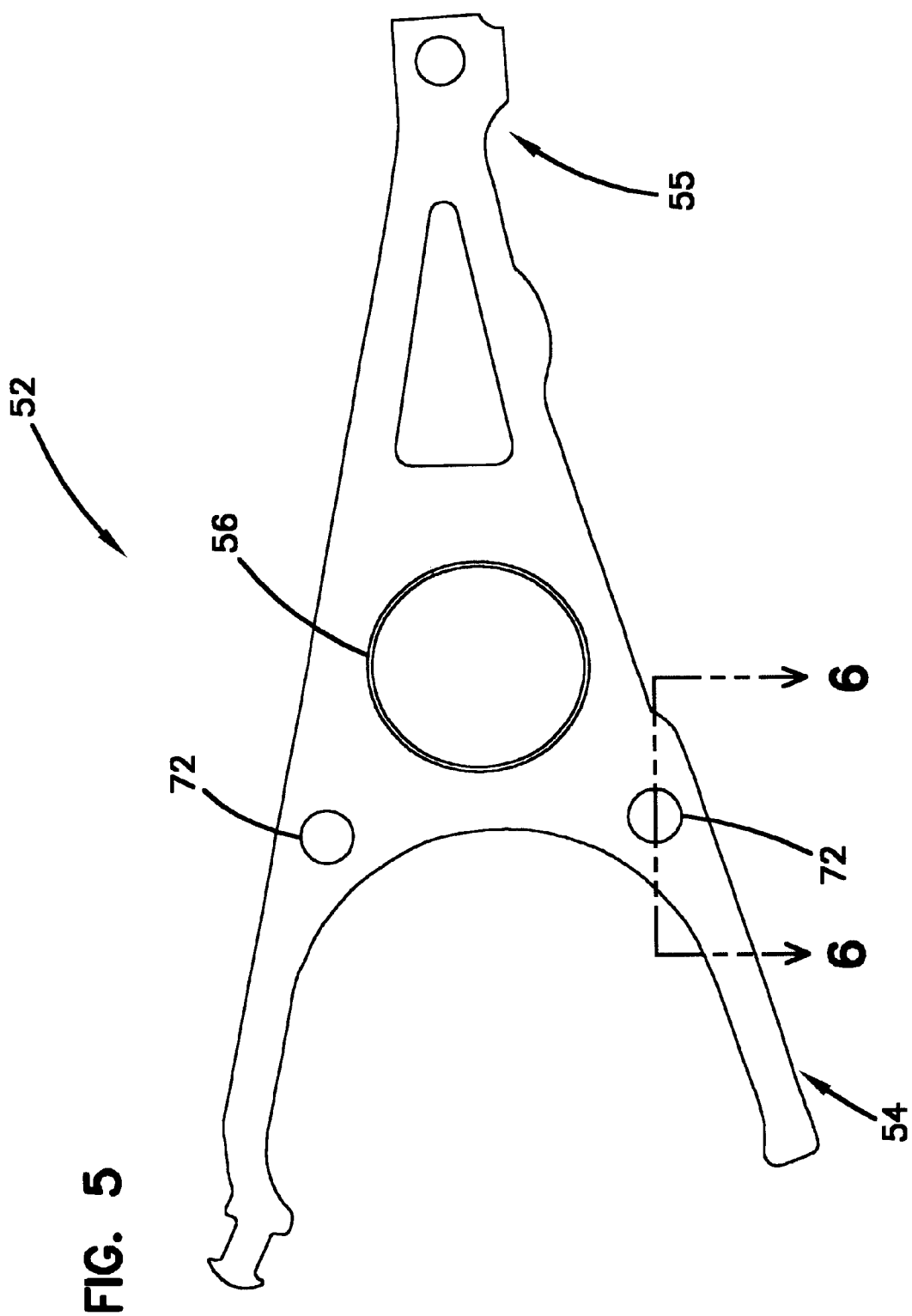
FIG. 5 is a top view of the actuator arm illustrating the impeding apertures according to the present invention.
Figure 6:
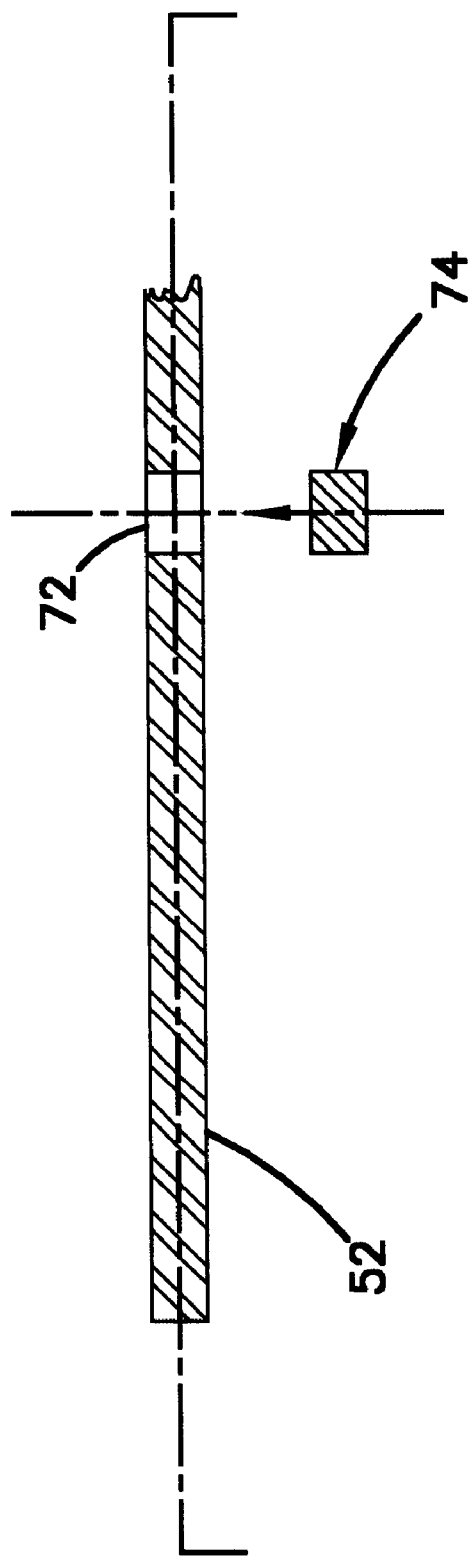
FIG. 6 is a side view of the actuator arm illustrating the impeding apertures through line 6—6 of FIG. 5 and plugging members according to the present invention.
Figure 7:
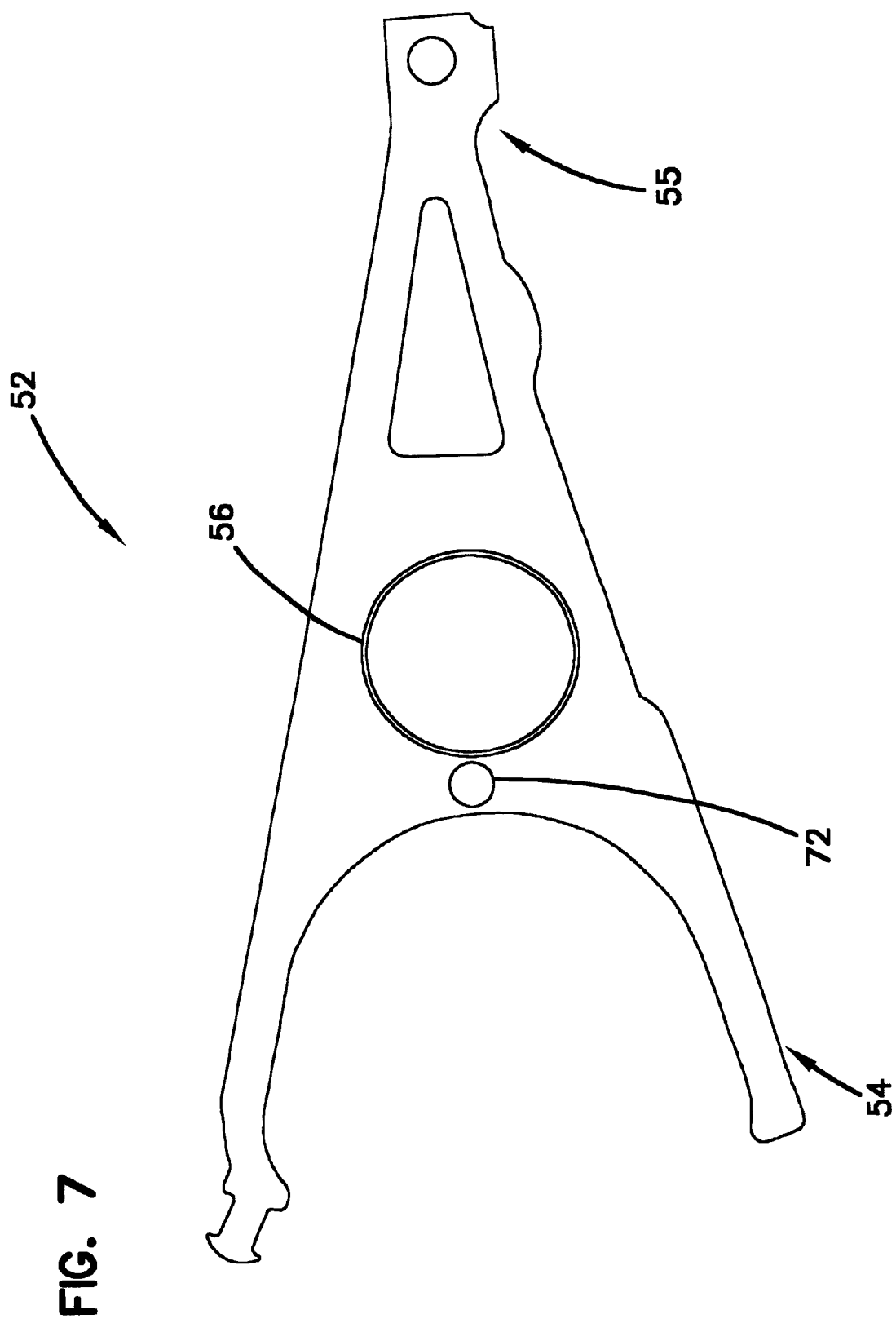
FIG. 7 is a top view of the actuator arm illustrating a single impeding aperture according to the present invention.

With reference now to FIGS. 4 and 5, a preferred embodiment of the actuator arm 52, including impeding apertures 72, is shown. The actuator arm 52 may also include plugging members, which will be explained in greater detail below. The impeding apertures 72 may be a plurality of holes, preferably two, located at the back end 54 of the actuator arm between the pivot point 56 and the voice coil 58. The holes extend entirely through the actuator arm 52 (See FIG. 6). An even number of impeding apertures on opposed longitudinal sides of the actuator arm is preferred so that the actuator arm is precisely balanced. Furthermore, an even number of impeding apertures ensures that equal amounts of weight are provided on either side of the actuator arm so that the heads are less susceptible to linear shock, torsion and vibration. Moreover, impeding apertures reduce the mass of the actuator arm, thus reducing the access time because less torque is required to pivot the actuator arm. The actuator arm may also include a single hole which is centered on the actuator arm, as shown in FIG. 7.

It is understood that the impeding apertures may be positioned anywhere on the actuator arm but are preferably located near the back end so that the vibration is isolated before any vibration can be transmitted to the read/write heads as explained hereinafter. It is also understood that various other configurations are contemplated. The impeding apertures may be of a variety of shapes such as slots, squares, and triangles, as well as notches formed in the outer perimeter of the actuator arm.

Referring now to ICG. 6, the plugging members 74 are shown. The plugging members 74 are inserted into and in proximate contact with the impeding apertures 72. The plugging members 74 extend entirely through the impeding apertures 72 and are of the same circumferential size and configuration. The material of the plugging members is preferably plastic or metal, such as cured urethane resin or nickel-titanium (Nitinol) alloy metal. When using a plastic, the plugging members 74 are secured within the impeding apertures by expanding via curing and forming a bond with the inner surface of the impeding apertures. When using a metal, the plugging members 74 are secured within the impeding apertures by expanding via application of heat and forming a bond with the inner surface of the impeding apertures. Nitinol metal is a preferred material because of its material composition. Nitinol undergoes a phase transition upon heating wherein the material expands forming a tight interference fit leaving the internal structure altered so that the expansion is irreversible. Thereafter, cooling does not cause the plugging member made of Nitinol to shrink. As a result of the expansion, no adhesives are required to secure the plugging member. Moreover, the method itself does not produce any vapor, therefore, there is no outgassing. It is understood that other materials may be used, as long as the material exhibits favorable damping qualities and is of a dissimilar material than the actuator arm.

The plugging members are also beneficial to the disk drives's overall stability and immunity to contaminants. For example, plugging members made of copper metal may function to attract contaminants in the disk drive. Notably, copper attracts contaminants such as sulphur. Copper may preferentially react with a contaminant so that the contaminant does not react with other components within the disk drive. The copper chemically binds the contaminant so that it is effectively removed from the disk drive system. Moreover, a plugging member having a lower density than the material comprising the body of the actuator arm may reduce the mass of the actuator arm, thus reducing the access time because less torque is required to pivot the actuator arm.

The operation of the actuator assembly 30 will be explained with reference to FIGS. 3 and 4. As stated above, the function of the actuator assembly 30 is to position read/write heads 24 with respect to the surfaces of the disk 22 by pivoting the actuator arm 52. More specifically, the actuator assembly positions the read/write heads over individual tracks on the disk so that information can be retrieved or stored. The voice coil 58 and magnets 60, 62, which are located near the back end 54 of the actuator arm 52, produce a force which pivots the actuator arm 52. This force may create a vibration which tends to propagate through the actuator arm. The vibration reaches the impeding apertures 72 and reflects back towards the voice coil motor assembly 34, thus exhibiting a vibration isolation effect. Moreover, the plugging members 74 which comprise a material with a high damping coefficient, reduce vibration by dissipating some of the vibrational energy internally.

According to the present invention, the impeding apertures and/or plugging members block transmission of the mechanical vibrations to the read/write heads by applying principles of impedance mismatching, as will be explained hereinafter. Mechanical impedance affects the degree of stress wave reflectance in a solid material. Mechanical impedance is related to the ratio of material displacement to the stress at any point within a solid body throughout a vibration cycle. It may be expressed as a combination of the mass density and the elastic properties for a given solid body.

Generally, stress waves may readily travel through a solid body until they reach an interface where there is a sharp discontinuity of mechanical material properties. Such interfaces usually occur at the bounding surfaces of the solid body or at joints between dissimilar materials in a composite solid. For example, if there are two elastic solids bonded together at an interface and the impedance of the first solid on one side of the interface is equal to the impedance of the second solid on the other side of the interface, the stress wave may pass through the two solids without reflection because adjacent material particles on both sides of the interface experience the same stress state at any time. Therefore, the vibration energy of the stress wave will be transmitted across the interface. It is understood that the materials may be dissimilar and that total stress wave transmission will occur if the impedance of the material on one side of the interface is matched to the impedance of the material on the other side. This is possible since the impedance is a combination of both density and elastic properties. In contrast, if the impedance of the two solids is not equally matched, the stress states experienced by adjacent material particles on opposite sides of the interface will be different. Therefore, the stress wave, and thus the vibration energy, is reflected at the interface and propagated back towards the source of the incident stress wave in order to satisfy the condition of continuity of stress at the interface between the two solids. It is understood that the impedance mismatching will also occur at free surfaces where, in the absence of surface traction, the solid surface must be at a state of zero stress.

In the present invention, the impeding apertures and/or plugging members represent a sharp discontinuity in the material of the actuator arm and change the natural frequency of the vibration resonating from the voice coil in the disk drive. The impeding apertures and/or plugging members have a significantly different mechanical impedance than the material of the actuator arm. Since the stress states are not continuous across the interface of the actuator arm and impeding apertures and/or plugging members, in the case of the impeding apertures the vibration is reflected back towards the voice coil motor assembly and prevented from being transmitted to the read/write heads. With the addition of the plugging members, the vibration is also reduced by damping wherein the vibrational energy is dissipated internally.

The impeding apertures also change the mode shapes of the system. A mode shape is the shape a body assumes when it is deformed by undergoing vibration at a particular frequency. Locating a node, which is a location on a vibrating member which shows little or no motion, on a mode shape would be beneficial to the system. For example, if the node was located at a head position on the actuator arm (for a given frequency), the head would suffer little vibrational motion even though other parts of the actuator arm are vibrating.

It is understood that the specific size, number, shape and placement of the impeding apertures and plugging members may be adjusted within the actuator arm to alter the vibrations resulting from the specific wavelength(s) of the stress waves created by the voice coil motor assembly. Also, the cross-section of the impeding apertures and/or plugging members may be varied or the interface may be curved in order to redirect the vibration waves. Furthermore, a combination of impeding is apertures and plugging members (i.e. holes, notches, or slots) may be used in the design of the actuator arm and be beneficial to the isolation of vibration. It is also understood that a vibrational disturbance which shifts the position of the read/write head relative to the data track on the disk severely affects the ability of the disk drive to read or write data to the disk. However, a vibrational disturbance of the same magnitude which shifts the voice coil relative to the magnet(s) has no practical impact on the performance of the disk drive. Moreover, it is anticipated that an impeding apertures and/or plugging members may be located on other components of the disk drive in order to eliminate other sources of destructive contact to the disk drive, such as external shock and vibration.

Although the invention has been described in detail herein, it should be understood that the invention is not limited to the embodiments herein disclosed. Various changes, substitutions and modifications may be made thereto by those skilled in the art without departing from the spirit or scope of the invention as described and defined by the appended claims.

What is claimed is:

1. An actuator assembly for a disk drive, comprising:
   an actuator arm capable of pivoting with respect to a disk, said actuator arm having at least one impeding aperture for creating an impedance mismatch in the actuator arm. said impedance mismatch capable of isolating vibration; and
   at least one plugging member which is received in said at least one impeding aperture, said at least one plugging member being in proximate contact with said at least one aperture.

2. An actuator assembly as recited in claim 1, wherein said at least one impeding aperture comprises two holes.

3. An actuator assembly as recited in claim 1, further comprising a head gimbal assembly attached to said actuator arm for supporting a head on an air bearing over the disk in the disk drive, said head gimbal assembly comprising:
   a suspension arm;
   a flexure; and
   a read/write head mounted on said flexure for transferring information between said read/write head and the disk on the disk drive.

4. An actuator assembly as recited in claim 1, wherein said at least one plugging member is made of urethane.

5. An actuator assembly as recited in claim 1, wherein said at least one plugging member is made of nickel-titanium.

6. An actuator assembly as recited in claim 1, wherein said at least one impeding aperture is located near a back end of said actuator arm.

7. A disk drive, comprising:
   a disk; and
   an actuator arm capable of pivoting with respect to the disk, said actuator arm having two holes for creating an impedance mismatch in the actuator arm, said impedance mismatch capable of isolating vibration, in which the holes are positioned on opposed sides of the actuator arm.

8. A disk drive as recited in claim 7, further comprising at least one plugging member which is received in at least one of said holes, said at least one plugging member being in proximate contact with and extending entirely through said at least one of said holes.

9. A disk drive as recited in claim 8, wherein said at least one plugging member is made of urethane material.

10. A disk drive as recited in claim 8, wherein said at least one plugging member is made of Nitinol material.

11. A disk drive as recited in claim 7, wherein said two holes are located near a back end of said actuator arm.

12. A disk drive, comprising:
    a disk; and
    an actuator arm capable of pivoting with respect to the disk, said actuator arm having a hole for creating an impedance mismatch in the actuator arm, said impedance mismatch capable of isolating vibration, in which the hole is substantially centered relative to opposed sides of the actuator arm.

13. A disk drive as recited in claim 12, further comprising a plugging member which is received in said hole, said plugging member being in proximate contact with and extending entirely through said hole.

14. A disk drive as recited in claim 13, wherein said plugging member is made of urethane material.

15. A disk drive as recited in claim 13, wherein said at least one plugging member is made of Nitinol material.

16. A disk drive as recited in claim 12, wherein said hole are located near a back end of said actuator arm.

* * * * *